United States Patent
Perkins

(10) Patent No.: US 7,068,785 B2
(45) Date of Patent: Jun. 27, 2006

(54) TABLE DRIVEN METHOD FOR CALCULATING ARITHMETIC INVERSE FOR USE IN CRYPTOGRAPHY

(75) Inventor: Gregory M. Perkins, Pennington, NJ (US)

(73) Assignee: Matsushita Electric Industrial Co., Ltd., Oaska (JP)

( * ) Notice: Subject to any disclaimer, the term of this patent is extended or adjusted under 35 U.S.C. 154(b) by 872 days.

(21) Appl. No.: 10/067,563

(22) Filed: Feb. 5, 2002

(65) Prior Publication Data

US 2003/0147529 A1   Aug. 7, 2003

(51) Int. Cl.
*H04L 9/00* (2006.01)
(52) U.S. Cl. .................. 380/30; 380/268; 380/28
(58) Field of Classification Search ............ 380/30, 380/264, 265, 28; 708/491
See application file for complete search history.

(56) References Cited

U.S. PATENT DOCUMENTS

| | | | |
|---|---|---|---|
| 5,497,423 A * | 3/1996 | Miyaji .................. | 380/30 |
| 6,345,098 B1 * | 2/2002 | Matyas et al. .......... | 380/46 |
| 6,570,988 B1 * | 5/2003 | Venkatesan et al. ..... | 380/28 |
| 6,609,141 B1 * | 8/2003 | Montague .............. | 708/491 |
| 6,763,366 B1 * | 7/2004 | Hars et al. ............ | 708/491 |
| 6,772,184 B1 * | 8/2004 | Chang ................. | 708/491 |
| 6,795,553 B1 * | 9/2004 | Kobayashi et al. ...... | 380/28 |
| 6,925,479 B1 * | 8/2005 | Chen et al. ........... | 708/491 |
| 2001/0054052 A1 * | 12/2001 | Arazi ................ | 708/491 |
| 2002/0052906 A1 * | 5/2002 | Chang ................ | 708/650 |
| 2002/0055962 A1 * | 5/2002 | Schroeppel ........... | 708/650 |

OTHER PUBLICATIONS

J. Sorenson, "An Analysis of Lehmer's Euclidean Algorithm"; Department of Mathematics and Computer Science; Butler University, 1995.*
Introduction to No. Theory, http://www.cs.adfa.oz.au/teaching/studinfo/csc/lectures/publickey.html, 1999.*
37. R. P. Brent; "Analysis of the Binary Euclidean Algorithm", in New Direction and Results in Algorithms and Complexity (edited by J.F. Traub), Academic Press, New York, 1976, 321-355.*
J. Sorenson, "An Analysis of Lehmer's Euclidean GCD Algorithm"; Department of Mathematics and Computer Science; Butler University, 1995.
Introduction to Number Theory, http://www.cs.adfa.oz.au/teaching/studinfo/csc/lectures/publickey.html. 1999.

(Continued)

*Primary Examiner*—David Jung
*Assistant Examiner*—Thomas Szymanski
(74) *Attorney, Agent, or Firm*—RatnerPrestia

(57) ABSTRACT

A method for calculating the arithmetic inverse of a number V modulo U, where U is a prime number, that may be used in cryptography, uses a modified extended greatest common divisor (GCD) algorithm that includes a plurality of reduction steps and a plurality of inverse calculations. In this algorithm, the values U and V are assigned to respective temporary variables U3 and V3 and initial values are assigned to respective temporary variables U2 and V2. The algorithm then tests a condition and, if the condition tests true, combines multiple ones of the plurality of reduction steps and multiple ones of the inverse calculations into a single iteration of the GCD algorithm.

18 Claims, 6 Drawing Sheets

OTHER PUBLICATIONS

37. R. P. Brent; "Analysis of the binary Euclidean algorithm", in New Direction and Results in Algorithms and Complexity (edited by J. F. Traub), Academic Press, New York, 1976, 321-355.

* cited by examiner

TABLE DRIVEN METHOD FOR CALCULATING ARITHMETIC INVERSE FOR USE IN CRYPTOGRAPHY

BACKGROUND OF THE INVENTION

The present invention is directed to extended greatest common divisor algorithms and in particular to improved extended binary and extended left-shift binary greatest common divisor algorithms that efficiently calculate arithmetic inverses over finite fields using tables of pre-computed values.

Modular arithmetic is used in many applications such as encryption algorithms and the generation of error correcting codes. When the modulus is a prime number (P), the operations of addition, subtraction, multiplication and division with nonzero elements as well as the associative, commutative and distributive properties are defined over the set of numbers from zero to p. This set of numbers defines a finite field modulo P, $F_p$. These fields are often referred to as "Prime Fields".

Extended GCD algorithms are commonly used to find inverses in large finite fields, which are of interest for encryption purposes. As used herein, the term "extended" indicates that the GCD algorithm has been modified to calculate inverses. One type of encryption algorithm encrypts data using exponentiation over a large finite field, relying on the inherent difficulty of the inverse of exponentiation, the discrete logarithm problem, to hold the data secure. Encryption performed on a large finite field (having more elements) is more secure than encryption performed on a small field. One problem with using large finite fields, however, is the difficulty in performing even simple arithmetic operations on the large numbers in the field. Typical numbers used in data encryption have hundreds of bits. These numbers are too large to be easily handled by commonly available microprocessors that are limited to 32 or 64-bit arithmetic. This is especially true of exponentiation where a 100-bit number is raised to the power of second 100-bit number and the result is determined modulo a third 100-bit number. As described below, calculations using these large numbers are typically handled using multiprecision arithmetic.

Another type of encryption algorithm uses multiplication by an integer number within an elliptic curve group, where the group operation is symbolized by addition. (It is the analogous to exponentiation in groups, where the group operation is denoted by multiplication.) An elliptic curve group is defined on ordered pairs of points of a grid that lie on an elliptic curve defined by an equation such as equation (1)

$$Y^2=(X^3+A\cdot X+B) \text{ modulo } P \quad (1)$$

where P is a prime number equal to the number of rows and the number of columns in the grid together with a special point $\bigcirc$, called the point at infinity. In elliptic curve cryptography, an encryption key is generated by multiplying a generator point P by itself k times. (i.e. Q=kP, where Q is the encryption key).

Multiplication by an integer in the elliptic curve group is modeled as repeated addition of the group elements to themselves. Addition of a group element to itself in an elliptic curve group, however, is not as simple as integer addition. Because points in the elliptic curve group are ordered pairs, addition may be represented as, $(X_1,Y_1)+(X_2,Y_2)=(X_3,Y_3)$ where $X_3$, $Y_3$ are defined by equations (2) and (3) if neither of the points is the point at infinity (in which case the definition states that $(X_1,Y_1)+\bigcirc=(X_1,Y_1)$). L, a variable used in equations (2) and (3) is defined by equation (4).

$$X_3=L^2-X_1-X_2 \text{ modulo } P \quad (2)$$

$$Y_3=L(X_1-X_3)-Y_1 \text{ modulo } P \quad (3)$$

$$L=(Y_2-Y_1)/(X_2-X_1) \text{ modulo } P \quad (4)$$

If $X_1=X_2$ and $Y_1=Y_2$, $X_3$ and $Y_3$ are defined by equations (5) and (6).

$$X_3=L^2-2X_1 \text{ modulo } P \quad (5)$$

$$Y_3=L(X_1-X_3)-Y_1 \text{ modulo } P \quad (6)$$

$$L=(3X_1^2+A)/2Y_1 \quad (7)$$

Where A is the coefficient of X in equation (1).

Thus, addition of two members of the elliptic curve group involves a modular integer division operation. In modular arithmetic, division of a value N by a value D is often best handled as a multiplication of N by the arithmetic inverse of D, $D^{-1}$. It is known that an arithmetic inverse of a number in a finite field may be calculated using an extended greatest common divisor (GCD) algorithm.

FIG. 1 is a flow chart diagram, which illustrates an extended version of the Binary GCD algorithm. The algorithm shown in FIG. 1 calculates the greatest common divisor of U and V where U is greater than V. The algorithm relies on the property that if U and V have a common divisor D so does U-V, U-2V and so on. Thus, using only subtraction and division by two (a binary right shift), one can calculate the GCD of U and V. In general, GCD algorithms operate by successively reducing the values of U and V while maintaining the equations (8), (9) and (10)

$$U1\cdot U+U2\cdot V=U3 \quad (8)$$

$$V1\cdot U+V2\cdot V=V3 \quad (9)$$

$$T1\cdot U+T2\cdot V=T3 \quad (10)$$

where $U \geqq V$ and (U1, U2, U3) and (V1, V2, V3) are initially assigned the values of (1, 0, U) and (0, 1, V), respectively. If the algorithm is used to calculate the greatest common divisor of a prime number P and a value X, then, upon termination, U3=GCD(P, X)=1 and U2=$X^{-1}$ MOD P. In general terms, GCD algorithms operate by repetitively reducing the number of bits in the larger value, U, and switching the two values whenever U is less than V. Thus, the algorithm successively reduces the values of U3 and V3 while maintaining the equations. Because it also maintains the values U2 and V2, the algorithm shown in FIG. 1 not only calculates the greatest common divisor of U and V but also calculates $V^{-1}$, the inverse of V modulo U (assuming U is a prime). Furthermore, it is noted that the variables U1, V1 and T1 do not need to be maintained because they can be determined from the other variables, for example, U1 can be determined from U2 and U3 by the identity U1=(U3−U2·V)/U. As described below, when U is a prime number, this inverse may be used for division operations performed on the Finite field $F_U$.

The algorithm shown in FIG. 1 begins at step 110 by obtaining the values U and V and assigning the value of U to a temporary variable U3 and the value of V to a temporary variable V3. In the exemplary embodiment of the invention, the binary GCD process is used for encryption and U represents a large prime number, P.

Next, step 116 stores the current value of U3 into a temporary variable USAVE, sets a variable U2 to zero and sets a variable V2 to 1−USAVE. Next, step 122 is executed which assigns the value in V3 to a temporary variable T3, sets a temporary variable T2 to one and a temporary variable SIGN to zero.

After step 122, step 124 is executed which determines if T3 is even. If T3 is even the process performs a subtract and shift reduction. The first step in this reduction is step 126 which shifts T3 by one bit to less significant bit positions. In the exemplary processes shown in FIGS. 1, 2, 3 and 4, a shift operation toward less significant bits is a right-shift, and an operation which shifts a value x by y bit positions to the right is indicated by the function RS(x,y). After step 126, step 128 is executed which determines if T2 is even. If so, step 130 shifts T2 to less significant bit positions by one bit and transfers control to step 124, described above.

If T2 is odd at step 128, step 132 is executed which determines if T2 is greater than or equal to zero. If T2 is greater than or equal to zero, step 136 is executed which calculates the value T2−SAVE, shifts the value to less significant bit positions by one bit and assigns the result to T2. If, at step 132, T2 is less than zero, then step 134 calculates the value T2+USAVE, shifts the value to less significant bit positions by one bit and assigns the result to T2. After step 132 or step 134, control transfers to step 124, described above. The algorithm shown in FIG. 1 assumes that U is odd and, thus, that USAVE is odd. At step 132, T2 is odd. Either adding or subtracting two odd numbers produces an even number.

If T3 is odd at step 124, the algorithm performs a subtraction reduction process. The first step in this process, step 138, determines the value of the variable SIGN. If SIGN equals one, step 140 is executed which sets U3 to T3 and sets U2 to T2. Otherwise, step 142 is executed which sets V3 to T3 and V2 to T2. After step 140 or 142, step 144 is executed which compares U3 and V3. If U3 is greater than V3, then step 146 is executed which sets SIGN to one, sets T3 to U3 minus V3 and sets T2 to U2 minus V2. If U3 is not greater than V3 at step 144, then step 148 is executed which sets SIGN to zero, sets T3 to V3 minus U3 and sets T2 to V2 minus U2. After step 146 or step 148, step 150 is executed which tests the value in T3 to determine if the GCD process is done. If T3 equals zero then the process is done and step 152 is executed which returns U3 and U2. Because, in the exemplary embodiment, U is prime, U3 is equal to one and U2 equals $V^{-1}$ modulo U.

The reduction step for exemplary binary GCD algorithm performs a single subtraction and a single shift operation during each reduction step. While this algorithm, because it uses only addition, subtraction and shifting, may be implemented using only relatively simple hardware it typically uses many iterations to find the GCD and, thus, the inverse of numbers typically used in cryptography.

SUMMARY OF THE INVENTION

The present invention is embodied in a method for calculating the arithmetic inverse of a number V modulo U, where U is a prime number. The method uses an extended greatest common divisor (GCD) algorithm that includes a plurality of reduction steps and a plurality of inverse calculations. According to the method, the values U and V are assigned to respective temporary variables U3 and V3 and initial values are assigned to respective temporary variables U2 and V2. The algorithm then tests a condition and, if the condition tests true, combines multiple ones of the plurality of reduction steps and multiple ones of the inverse calculations into a single iteration of the GCD algorithm.

According to one aspect of the invention, the GCD algorithm is a binary GCD algorithm and the condition concerns a number of zero-valued least significant bits for the value U3.

According to another aspect of the invention, the multiple inverse calculations are combined by indexing a look-up table containing multiples of U and reducing V2 in magnitude by the value of multiple of U obtained from the look-up table.

According to another aspect of the invention, the GCD algorithm is a left-shift binary algorithm and the condition concerns the relative positions of most significant bits in the values U3 and V3.

According to yet another aspect of the invention, the GCD the step of combining multiple reduction steps and multiple inverse calculations includes invoking a reduction step from a Lehmer GCD algorithm instead of the left-shift binary reduction step.

DETAILED DESCRIPTION

Figure 1:
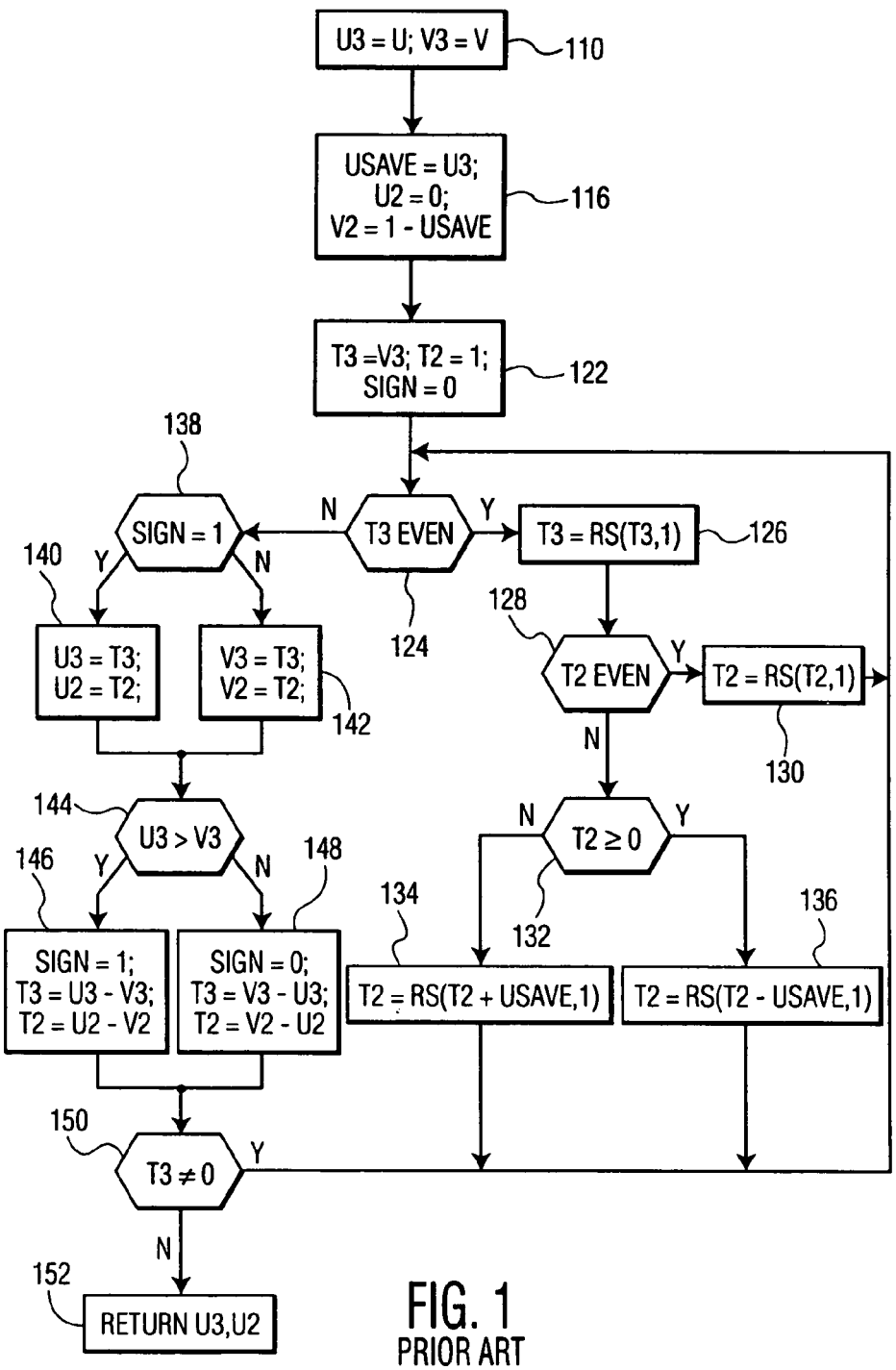
FIG. 1 (prior art) is a flow-chart diagram of an extended binary GCD algorithm.
Figure 2:
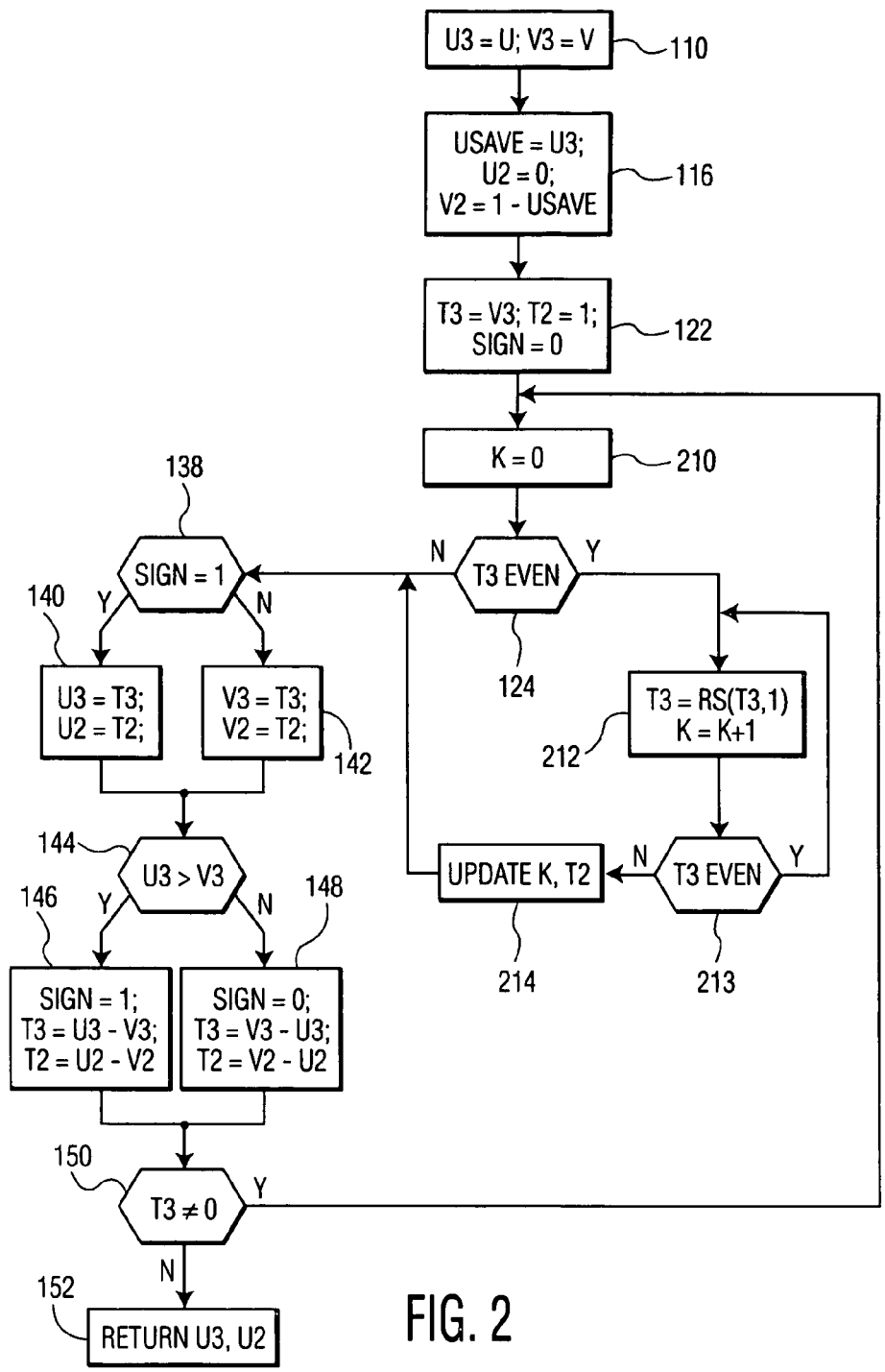
FIG. 2 is a flow-chart diagram of an exemplary modified extended binary GCD algorithm according to the present invention.

FIG. 2 shows an exemplary binary GCD algorithm in accordance with the present invention. Steps 110, 116, 122, 124, 138, 140, 142, 144, 146, 148, 150 and 152 of this algorithm are identical to the same-numbered steps described above with reference to FIG. 1. For the sake of brevity, these steps are not described here. The difference between the binary GCD algorithms shown in FIGS. 1 and 2 is in the subtract-and-shift reduction step. In FIG. 1, the steps 134 and 136 each perform a subtract and shift operation and one of these steps is executed for each iteration through the loop whenever T2 is odd. The present invention replaces the single subtract-and-shift step with a step that effectively performs multiple subtract and shift operations by accessing data from a look-up table (LUT).

The look-up table is implemented in three different tables. One table, U[M] has values of U, 2U, 3U, 4U and 5U and the other two tables, LUT2 and LUT3, determine which of the five values in the first table is to be added to or subtracted from the value T2.

The idea is to perform multiple additions/subtractions in a single step when T3 is divisible by 4 or 8. For example, if T3 is divisible by 4 and T2 is negative and has a magnitude that is less than U then in the normal Binary GCD method U is added to T2 and then T2 is shift to less significant bit positions by one bit. Then, if T2 is still odd, U is subtracted from T2 and the result is shifted again. These steps are defined by equation (11).

$$((T2+U)/2-U)/2=(T2+U-2U)/4=(T2-U)/4 \quad (11)$$

As equation (11) demonstrates, the combined operation may be simplified by subtracting U from T2 and shifting the result by two bit positions.

The above idea is expanded to construct look-up tables which update the value of T2 based on the least significant bits of U and T2. It is noted that the values for the T2≧0 table is symmetric to the T2<0 values except for the sign of the value which has been switched Thus, the tables for T2<0 is not listed when the last three binary digits of T3 are x"000."

If the last two binary digits of T3 are x"00" and the absolute value of T2 is less than or equal to U then the simplified operations for updating T2 are defined by Table 1.

TABLE 1

| U | T2 | T2 ≧ 0 | T2 < 0 |
|---|----|--------|--------|
| 01 | 00 | T2/4 | T2/4 |
|    | 01 | (T2 − U)/4 | (T2 + U)/4 |
|    | 10 | (T2 − 2U)/4 | (T2 + 2U)/4 |
|    | 11 | (T2 + U)/4 | (T2 − U)/4 |
| 11 | 00 | T2/4 | T2/4 |
|    | 01 | (T2 + U)/4 | (T2 − U)/4 |
|    | 10 | (T2 − 2U)/4 | (T2 + 2U)/4 |
|    | 11 | (T2 − U)/4 | (T2 + U)/4 |

If the last two binary digits of T3 are x"00" and the absolute value of T2 is greater than U then the simplified operations for updating T2 are defined by Table 2.

TABLE 2

| U | T2 | T2 ≧ 0 | T2 < 0 |
|---|----|--------|--------|
| 01 | 00 | T2/4 | T2/4 |
|    | 01 | (T2 − U)/4 | (T2 + U)/4 |
|    | 10 | (T2 − 2U)/4 | T2 + 2U)/4 |
|    | 11 | (T2 − 3U)/4 | (T2 + 3U)/4 |
| 11 | 00 | T2/4 | T2/4 |
|    | 01 | (T2 − 3U)/4 | (T2 + 3U)/4 |
|    | 10 | (T2 − 2U)/4 | (T2 + 2U)/4 |
|    | 11 | (T2 − U)/4 | T2 + U)/4 |

If T2 is greater than or equal to zero, the last three binary digits of T3 are x"000" and the absolute value of T2 is less than or equal to U then the simplified operations for updating T2 are defined by Table 3.

TABLE 3

| U | T2 |  | U | T2 |  |
|---|----|--|---|----|--|
| 001 | 000 | T2/8 | 011 | 000 | T2/8 |
|     | 001 | (T2 − U)/8 |     | 001 | (T2 − 3U)/8 |
|     | 010 | (T2 − 2U)/8 |     | 010 | (T2 + 2U)/8 |
|     | 100 | (T2 − 4U)/8 |     | 100 | (T2 − 4U)/8 |
|     | 011 | (T2 − 3U)/8 |     | 011 | (T2 − U)/8 |
|     | 101 | (T2 + 3U)/8 |     | 101 | (T2 + U)/8 |
|     | 110 | (T2 + 2U)/8 |     | 110 | (T2 − 2U)/8 |
|     | 111 | (T2 + U)/8 |     | 111 | (T2 + 3U)/8 |
| 101 | 000 | T2/8 | 111 | 000 | T2/8 |
|     | 001 | (T2 + 3U)/8 |     | 001 | (T2 + U)/8 |
|     | 010 | (T2 − 2U)/8 |     | 010 | (T2 + 2U)/8 |
|     | 100 | (T2 − 4U)/8 |     | 100 | (T2 − 4U)/8 |
|     | 011 | (T2 + U)/8 |     | 011 | (T2 + 3U)/8 |
|     | 101 | (T2 − U)/8 |     | 101 | (T2 − 3U)/8 |

TABLE 3-continued

| U | T2 |  | U | T2 |  |
|---|----|--|---|----|--|
|   | 110 | (T2 + 2U)/8 |   | 110 | (T2 − 2U)/8 |
|   | 111 | (T2 − 3U)/8 |   | 111 | (T2 − U)/8 |

If T2 is greater than or equal to zero, the last three binary digits of T3 are x"000" and the absolute value of T2 is greater than U then the simplified or updating T2 are defined by Table 4.

TABLE 4

| U | T2 |  | U | T2 |  |
|---|----|--|---|----|--|
| 001 | 000 | T2/8 | 011 | 000 | T2/8 |
|     | 001 | (T2 − U)/8 |     | 001 | (T2 − 3U)/8 |
|     | 010 | (T2 − 2U)/8 |     | 010 | (T2 + 2U)/8 |
|     | 100 | (T2 − 4U)/8 |     | 100 | (T2 − 4U)/8 |
|     | 011 | (T2 − 3U)/8 |     | 011 | (T2 − U)/8 |
|     | 101 | (T2 − 5U)/8 |     | 101 | (T2 + U)/8 |
|     | 110 | (T2 + 2U)/8 |     | 110 | (T2 − 2U)/8 |
|     | 111 | (T2 + U)/8 |     | 111 | (T2 − 5U)/8 |
| 101 | 000 | T2/8 | 111 | 000 | T2/8 |
|     | 001 | (T2 − 5U)/8 |     | 001 | (T2 + U)/8 |
|     | 010 | (T2 − 2U)/8 |     | 010 | (T2 + 2U)/8 |
|     | 100 | (T2 − 4U)/8 |     | 100 | (T2 − 4U)/8 |
|     | 011 | (T2 + U)/8 |     | 011 | (T2 − 5U)/8 |
|     | 101 | (T2 − U)/8 |     | 101 | (T2 − 3U)/8 |
|     | 110 | (T2 + 2U)/8 |     | 110 | (T2 − 2U)/8 |
|     | 111 | (T2 − 3U)/8 |     | 111 | (T2 − U)/8 |

The operations defined by each of the entries shown in tables 1–4 add or subtract a multiple of U from T2 and then divide the result by 4 or 8. The table LUT2 indicates which multiple of U is added or subtracted when the last two bits of T3 are x"00" for each possible value of the last two bits of U and T2, and the table LUT3 indicates which multiple of U is added or subtracted when the last three bits of T3 are "000." Because only the sign of the value changes when T2 is greater than equal to zero versus T2 being less than zero, separate tables do not need to be maintained for these two cases. In the exemplary embodiment of the invention, the tables LUT2 and LUT3 contain only the values for T2 greater than or equal to zero. Corresponding values for T2 less than zero are obtained by inverting the sign of the values from LUT2 and LUT3.

TABLE 5

| GRT = |T2| ≦ U | U[1:0] | T2 [1:0] | LUT2(GRT, U[0:1], T2[0:1]) |
|---|---|---|---|
| 0 | 01 | 00 | 0 |
| 0 | 01 | 01 | −1 |
| 0 | 01 | 10 | −2 |
| 0 | 01 | 11 | 1 |
| 0 | 11 | 00 | 0 |
| 0 | 11 | 01 | 1 |
| 0 | 11 | 10 | −2 |
| 0 | 11 | 11 | −1 |
| 1 | 01 | 00 | 0 |
| 1 | 01 | 01 | −1 |
| 1 | 01 | 10 | −2 |
| 1 | 01 | 11 | −3 |
| 1 | 11 | 00 | 0 |
| 1 | 11 | 01 | −3 |
| 1 | 11 | 10 | −2 |
| 1 | 11 | 11 | −1 |

One of ordinary skill in the art can readily derive LUT3 from the information in Tables 3 and 4 above. It is noted that if the value of U is known, only the part of the LUT's corresponding to the two or three low-order bits of U may be loaded for use by the program.

The algorithm shown in FIG. 2 differs from that shown in FIG. 1 at step 210 which sets a temporary variable K to zero. After it has been determined at step 124 that T3 is even, step 212 right-shifts T3 by one bit-position and increments K by one until T3 is found to be odd at step 213. Thus, after step 213, the value in the variable K is the number of least-significant zeroes in T3 at step 124. After step 213, when T3 is odd, step 214 is executed which updates the value of T2 as described below with reference to FIG. 3. After step 214 is executed, the process branches to step 138, described above.

Figure 3:
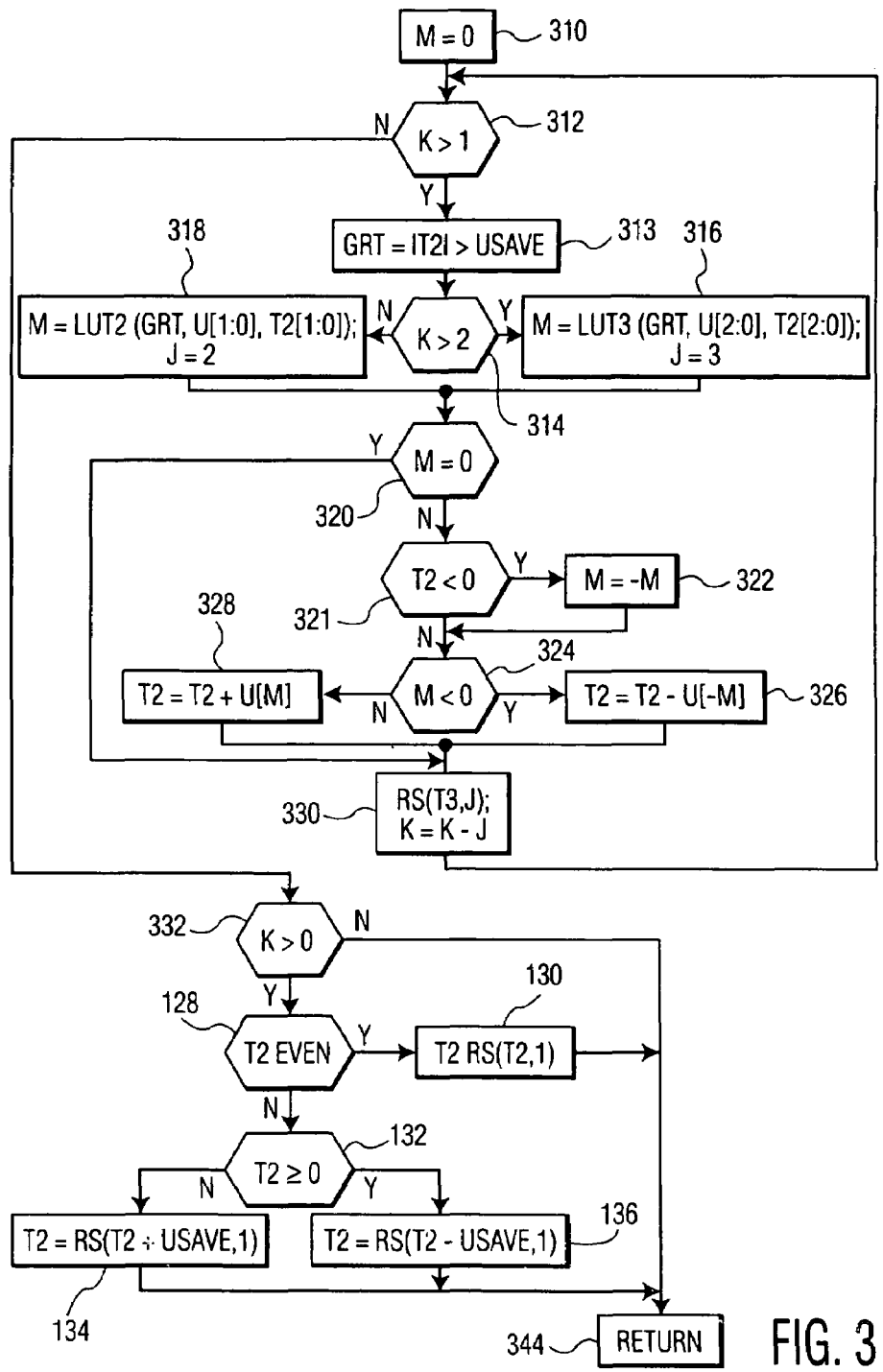
FIG. 3 is a flow-chart diagram of an exemplary step for combining multiple inverse calculations in the modified extended binary GCD algorithm shown in FIG. 2.

The process of updating T2 begins at step 310 of FIG. 3 which sets a temporary variable M to zero. At step 312, the process determines if K (i.e. the number of LSB zeros in T3 at step 124 of FIG. 2) is greater than one. If it is, the next step is step 313 which sets a temporary variable GRT to one if the absolute value of T2 is greater than USAVE and to zero if the absolute value of T2 is less than or equal to USAVE. The variable GRT is used to index LUT2 and LUT3. After step 313, the process determines, at step 314, if K is greater than two. If K is greater than two at step 314, then T3 has at least three LSB zeros and, at step 316, the value of M is obtained from LUT3 based on the value of GRT and the three LSBs of U and T2. Also at step 316, a temporary variable J, which controls the shifting step, is set to three. If K is not greater than two at step 314, then T3 has two LSB zeros and, at step 318, the value of M is obtained from LUT2 based on the value of GRT and the two LSBs of U and T2. Step 318 also sets the temporary variable J two.

After step 316 or 318, step 320 is executed which determines if M is equal to zero. If it is equal to zero, the process branches to the shift step, 332, described below. If M is not equal to zero then control transfers to step 321 which determines if T2 is less than zero. If it is, step 322 is executed which inverts the sign of M. If T2 is positive or zero at step 321 or after step 322, step 324 is executed which determines if M is less than zero. If M is less than or equal to zero, then at step 326, T2 is set to T2−U[−M]. Otherwise, at step 328, T2 is set to T2+U[M]. After step 326 or 328, the shifting step 330 is executed which shifts T2 to less significant bit positions by J bits and decrements K by J. After step 330, control transfers to step 312, described above.

If, at step 312, K is not greater than 1, then control transfers to step 332 which determines if K is greater than zero. If K equals zero, T2 has been updated and the process returns at step 344. If K is greater than zero (i.e. one) at step 332, then the process performs the same steps 128, 130, 132 and 134 or 136 as are performed in the binary GCD algorithm described above with reference to FIG. 1. After step 134 or 136 in FIG. 3, the process returns control to step 138 of FIG. 2, having updated T2.

The above embodiment of the invention improves the extended binary GCD algorithm by combining several reduction steps into a single step using look-up tables. The extended left-shift binary algorithm may also be modified by combining several reduction steps into a single step. This modification, however, combines the extended left-shift binary algorithm with an extended Lehmer GCD algorithm, as described below with reference to FIGS. 5 and 6.

Figure 4:
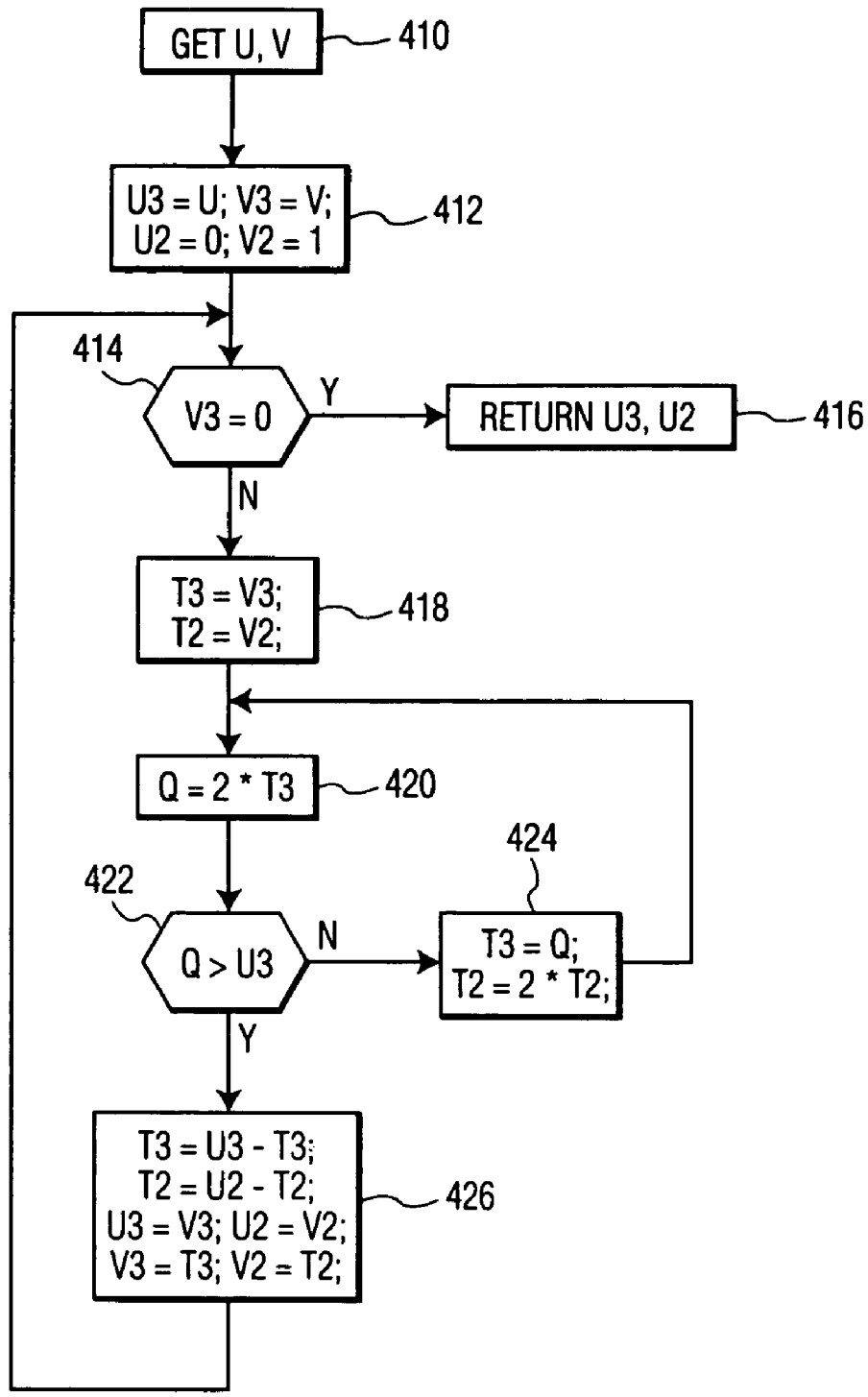
FIG. 4 (prior art) is a flow chart diagram of an extended left-shift binary GCD algorithm.

FIG. 4 is a flow-chart diagram of an extended left-shift binary algorithm. The algorithm begins at step 410 by obtaining the values U and V. In the exemplary embodiment of the invention, U may be a large prime number and V may be a value by which some number is to be divided in the finite field $F_U$. The result of the extended GCD algorithm is a value $V^{-1}$ that the algorithm may use to perform the division operation using multiplication. At step 412, temporary variables U3 and V3 are assigned the values U and V, respectively and temporary variables U2 and V2 are assigned the respective values zero and one. At step 414, the algorithm tests V3 to determine if the GCD, and thus $V^{-1}$, have been found. If V3 equals zero, the algorithm returns the current values of U3 (i.e. the GCD of U and V) and V2. In the exemplary embodiment, because U is a prime number, the GCD of U and V is one and U2 is $V^{-1}$ modulo U.

If, at step 414, V3 is not equal to zero, then, at step 418, the algorithm sets temporary variables T3 and T2 to V3 and V2, respectively. Next, at step 420, the algorithm sets temporary variable Q to T3 times 2 (i.e. shifts T3 to the left by one bit-position and assigns the result to Q). At step 422, the algorithm compares Q to U3 and if Q is less than or equal to U3, executes step 424 which assigns Q to T3 and doubles T2. After step 424, the algorithm branches to step 420, described above.

When, at step 422, Q is greater than U3, T3 is less than U3 and the algorithm executes step 426 which reduces U3 by subtracting T3 from it and, using the temporary variable T3, switches U3 and V3. Step 426 also reduces U2 by subtracting T2 from it and switches U2 and V2 using the temporary variable T2. After step 426, the left-shift binary algorithm branches to step 414, described above.

The reduction step of the left-shift binary algorithm operates by multiplying V by a power, k, of 2 such that $V*2^k \leq U$ and $V*2^{k+1} > U$. $V*2^k$ is then subtracted from U. U and V are switched and the process repeats. As described below, left-shift binary algorithm may be modified by including a extended Lehmer GCD reduction step, which effectively batches multiple the left-shift binary reduction steps into two multiplication operations and two subtractions. The combined method also batches multiple inversion computations into four multiplication operations and two addition/subtraction operations. Furthermore, the performed multiplication operations are word sized integers (e.g. 32-bit values) that multiply a multi-precision number. This operation is on the order of three multi-precision additions.

The Basic Lehmer-Euclid algorithm is described in an article by J. Sorenson entitled "An Analysis of Lehmer's Euclidean GCD Algorithm," *ACM International Symposium on Symbolic and Algebraic Computation (ISSAC)*, July 1995, pp 254–258. The algorithm described in the article calculates the GCD of U and V. In the subject invention, the extended Lehmer-Euclid reduction step is used in the left-shift binary GCD algorithm to combine multiple GCD and multiple inverse steps.

Figure 5:
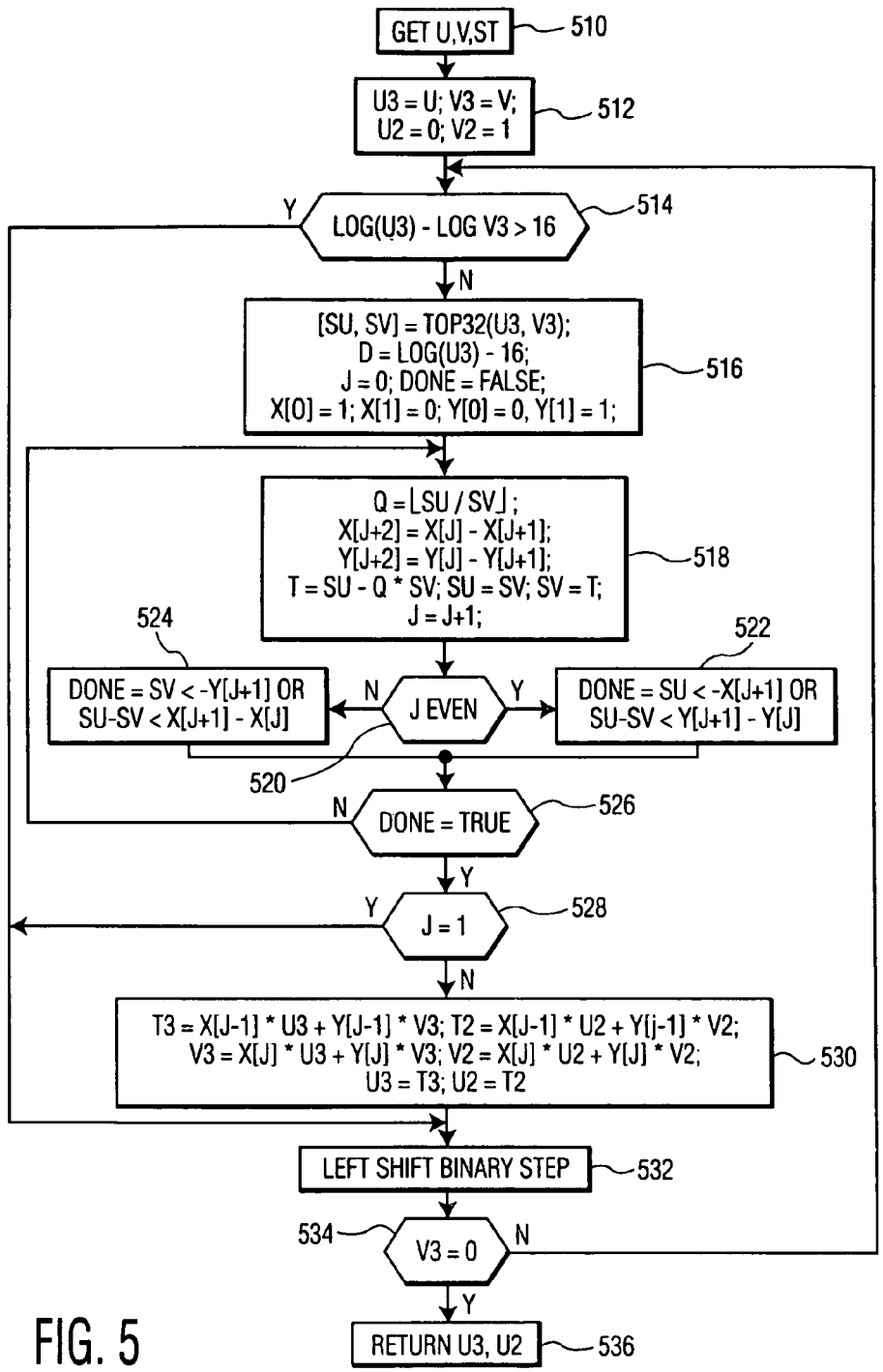
FIG. 5 is a flow-chart diagram of an exemplary modified extended left-shift binary GCD algorithm according to the present invention.

At step 510 of FIG. 5, the process obtains U and V. The next step in the process, step 512, assigns the values U and V to temporary variables U3 and V3, respectively. Also at step 512, the temporary variables U2 and V2 are initialized to 0 and 1, respectively. At step 514, the routine determines if the bit-position of the most significant bit in the value U3 differs from the bit-position of the most significant bit in the value V3 by more than 16. If this condition is true, control transfers to step 532, described below. Otherwise, control transfers to step 516. At step 516, the process initializes the inter-reduction step used by the Lehmer algorithm. This step, uses the function TOP32 to set temporary variables SU and SV to the normalized 32 most significant bits of the current values of U3 and V3, respectively. Step 516 also sets a temporary variable D to the index of the most significant non-zero bit in U3 minus 16 (i.e. $\log_2(U3)-16$); sets an index variable J to zero, a condition variable DONE to false;

and initializes the first two entries in the arrays X and Y, setting X[0] and Y[1] to one and X[1] and Y[0] to zero.

The function TOP32 identifies the most significant one in the value U3 and extracts this bit and the 31 next less significant bits of U3 as the 32 bit value. These 32 bits are assigned to the value SU. The same 32 bits are extracted from the value V3 and assigned to the value SV.

At step 518, the process calculates a value Q as the greatest integer less than the quantity SU divided by SV. In the exemplary embodiment of the invention, this division operation is performed using repeated shift and subtract operations. The processor used in this embodiment does not support 32-bit division operations. Next, step 518 assigns the value X[J]−X[J+1] to the array element X[J+2] and assigns the value Y[J]−Y[J+1] to the array element Y[J+2]. Also at step 518, the process reduces SU by the inter-reduction number of bits, by subtracting Q times SV from SU and assigns the result to a temporary variable T to facilitate switching the values of SU and SV. Finally at step 518, the process increments the index variable J by one.

At step 520, the routine determines if J is even or odd. If it is even then the routine, at step 522, calculates a value for the Boolean variable DONE as SU<−X[J+1] OR SU−SV<Y[J−1]−Y[J]. If J is odd at step 520 then the process, at step 524, calculates a value for the Boolean variable DONE as SV<−Y[J+1] OR SU−SV<X[J−1]−X[J]. After either step 522 or 524, the process, at step 526, tests the Boolean variable DONE. If it is true then control transfers to step 528, described below. If it is false control transfers to step 518 to perform another reduction step.

At step 528, the process determines if the index variable is equal to one. If it is, then control transfers to step 532, described below. If J is greater than one, the process, at step 530 calculates updated values for U3 and U2, according to equations (12) and (13) assigning the values to temporary variables T3 and T2.

$$T3 = X[J-1] \cdot U3 + Y[J-1] \cdot V3 \quad (12)$$

$$T2 = X[J-1] \cdot U2 + Y[J-1] \cdot V2 \quad (13)$$

The process also calculates new values for V3 and V2 according to equations (14) and (15).

$$V3 = X[J] \cdot U3 + Y[J] \cdot V3 \quad (14)$$

$$V2 = X[J] \cdot U2 + Y[J] \cdot V2 \quad (15)$$

Finally, the respective values in the temporary variables T3 and T2 are assigned to U3 and U2.

Figure 6:
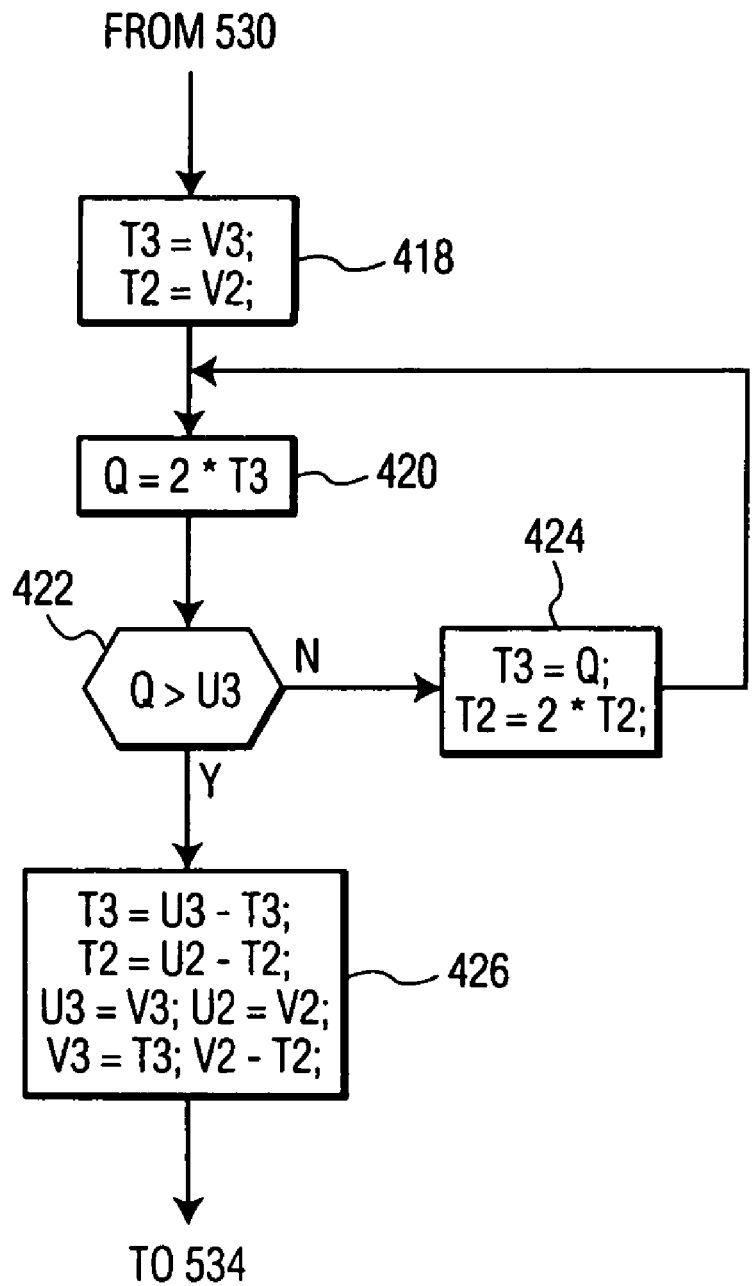
FIG. 6 is a flow-chart diagram of an exemplary left-shift binary reduction step suitable for use with the modified extended left-shift binary GCD algorithm shown in FIG. 5.

After step 530, after step 514 if the difference in the number of bits in U3 and V3 is greater than 32, or after step 528 if J is equal to one, step 532 is executed. This step performs the same inter-reduction step as the left-shift binary algorithm. This reduction step is shown in FIG. 6. As shown in FIG. 6, the reduction step includes the steps 418, 420, 422, 424 and 426, described above. After step 532, the process tests V3 to determine if the GCD has been found. If V3 is zero at step 534, then the process returns the values U3 and V2 as the GCD and inverse. Because U is prime in the exemplary embodiment of the invention, U3, the GCD of U and V, equals 1 and V2 equals $V^{-1}$ modulo U.

Although the invention has been described as a method, it is contemplated that it may be practiced by apparatus specially configured to perform the method or by computer program instructions embodied in a computer-readable carrier such as an integrated circuit, a memory card, a magnetic or optical disk or an audio-frequency, radio-frequency or optical carrier wave.

While the invention has been described in terms of exemplary embodiments it is contemplated that it may be practiced as described above within the scope of the attached claims.

What is claimed:

1. A method for performing modular division operations used in a cryptographic process over a finite field $F_U$ defined for a prime number U to generate a cryptographic key, in which cryptographic process at least one value is divided by an integer divisor V modulo U, the method comprising the steps of calculating an arithmetic inverse of V modulo U using an extended greatest common divisor (GCD) method which includes a plurality of reduction steps and a plurality of inverse calculations, including the steps of:

assigning U and V as initial values to respective temporary variables U3 and V3 which are used to calculate the GCD of U and V;

assigning initial values to respective temporary variables U2 and V2 which are used to calculate an arithmetic inverse of V module U;

determining whether U3 has a number, N, of zero-valued least significant bits (LSBs), where N is an integer greater than two, and if N is greater than two, combining multiple ones of the plurality of reduction steps for calculating the GCD; and combining multiple ones of the plurality of inversion calculations; and if N is not greater than 2, performing a single one of the reduction steps; and performing a single one of the inverse calculation steps;

returning, as a result of the plurality of reduction steps and the plurality of inverse calculations, the arithmetic inverse of V; and as a part of the cryptographic process, multiplying the at least one value by the returned arithmetic inverse in place of the integer division to produce the cryptographic key.

2. A method according to claim 1, wherein:

the extended GCD algorithm is a binary GCD algorithm;

the step of combining multiple ones of the plurality of reduction steps includes shifting the value in U3 by N bit positions to less significant bit positions; and the step of combining multiple ones of the plurality of inversion calculations includes the steps of:

retrieving a value to be combined with V2 from a look-up table responsive to the value of N;

combining the retrieved value from V2 to obtain a combined value in V2; and shifting the combined value in V2 by N bit positions to less significant bit positions.

3. A method according to claim 2, wherein the look-up table includes a plurality of multiples of U.

4. A method according to claim 3, wherein the step of retrieving the value to be combined with V2 from a look-up table includes the steps of:

indexing a first further look-up table responsive to two of the LSBs of V2 if N equals 2 to obtain an index value;

indexing a second further look-up table responsive to three of the LSBs of V2 if N is greater than 2 to obtain the index value; and indexing the look-up table by the index value.

5. A method for performing modular division operations used in a cryotographic process over a finite field $F_U$ defined for a prime number U to generate a cryptographic key, in which cryptographic process, at least one value is divided by an integer divisor V modulo U, the method comprising the steps of calculating an arithmetic inverse of V modulo U using an extending greatest common divisor (GCD) method which includes a plurality of reduction steps and a plurality of inverse calculations, including the steps of assigning U and V as initial values to respective temporary variables U3 and V3 which are used to calculate the GCD of U and V;

assigning initial values to respective temporary variables U2 and V2 which are used to calculate an arithmetic inverse of V modulo U;

determining whether a bit position of a most significant bit (MSB) of the value in U3 differs by less than a predetermined number from a bit position of an MSB of the value in V3, and if the bit position of the MSB of the value in U3 differs by less than the predetermined number from the bit position of the MSB of the value in V3, combining multiple ones of the plurality of reduction steps for calculating the GCD; and combining multiple ones of the plurality of inversion calculations; and if the bit position of the MSB of the value in the U3 does not differ by less than the predetermined number from the bit position of the MSB of the value in the V3, performing a single one of the reduction steps; and performing a single one of the inverse calculation steps;

returning, as a result of the plurality of reduction steps and the plurality of inverse calculations, the arithmetic inverse of V; and as a part of the cryptographic process, multiplying the at least one value by the returned arithmetic inverse in place of the integer division to produce the cryptographic key.

6. A method according to claim 5, wherein:

the extended GCD algorithm is a left-shift binary GCD algorithm; and the steps of combining multiple ones of the plurality of reduction steps and combining multiple ones of the plurality of inversion calculations includes the step of performing a reduction step according to a Lehmer GCD method.

7. A computer readable carrier including computer program instructions that cause a computer to perform modular division operations over a finite field $F_U$ defined for a prime number U and used in a cryptographic process in which at least one value is divided by an integer divisor V modulo U to generate a cryptographic key, the method comprising the steps of calculating an arithmetic inverse of V modulo U using an extended greatest common divisor (GCD) method which includes a plurality of reduction steps and a plurality of inverse calculations, including the steps of:

assigning U and V as initial values to respective temporary variables U3 and V3 which are used to calculate the GCD of U and V;

assigning initial values to respective temporary variables U2 and V2 which are used to calculate an arithmetic inverse of V modulo U;

determining whether U3 has a number, N, of zero-valued least significant bits (LSBs), where N is an integer greater than two, and if N is greater than two, combining multiple ones of the plurality of reduction steps for calculating the GCD; and combining multiple ones of the plurality of inversion calculations; and if N is not greater than two, performing a single one of the reduction steps; and performing a single one of the inverse calculation steps;

returning, as a result of the plurality of reduction steps and the plurality of inverse calculations, the arithmetic inverse of V; and as a part or the cryptographic process, multiplying the at least one value by the returned arithmetic inverse in place of the integer division to produce the cryptographic key.

8. A computer readable carrier according to claim 7, wherein:

the extended GCD algorithm is a binary GCD algorithm;

the computer program instructions which implement the step of combining multiple ones of the plurality of reduction steps cause the computer to perform the step of shifting the value in U3 by N bit positions to less significant bit positions; and the computer program instructions which implement the step of combining multiple ones of the plurality of inversion calculations cause the computer to perform the steps of;

retrieving a value to be combined with V2 from a look-up table responsive to the value of N;

combining the retrieved value from V2 to obtain a combined value in V2; and shifting the combined value in V2 by N bit positions to less significant bit positions.

9. A computer readable carrier according to claim 8, wherein the look-up table includes a plurality of multiples of U.

10. A computer readable carrier according to claim 9, wherein the computer program instructions that implement the step of retrieving the value to be combined with V2 from a look-up table cause the computer to perform the steps of:

indexing a first further look-up table responsive to two of the LSBs of V2 if N equals 2 to obtain an index value;

indexing a second further look-up table responsive to three of the LSBs of V2 if N is greater than 2 to obtain the index value; and indexing the look-up table by the index value.

11. A computer readable carrier including computer program instructions that cause a computer to perform modular division operations over a finite field $F_U$ that defined for a prime number U and used in a cryptographic process in which at least one value is divided by an integer divisor V modulo U to generate a cryptographic key, the method comprising the steps of calculating an arithmetic inverse of V modulo U using an extended greatest common divisor (GCD) method which includes a plurality of reduction steps and a plurality of inverse calculations, including the steps of:

assigning U and V as initial values to respective temporary variables U3 and V3 which are used to calculate the GCD of U and V;

assigning initial values to respective temporary variables U2 and V2 which are used to calculate an arithmetic inverse of V modulo U;

determining whether a bit position of a most significant bit (MSB) of the value in U3 differs by less than a predetermined number from a bit position of an MSB of the value in V3, and if the bit position of the MSB of the value in U3 differs by less than the predetermined number from the bit position of the MSB of the value in V3, combining multiple ones of the plurality of reduction steps for calculating the GCD; and combining multiple ones of the plurality of inversion calculations; and if the bit position of the MSB of the value in the U3 does not differ less than the predetermined number from the bit position of the MSB of the value in the V3, performing a single one of the reduction steps; and performing a single one of the inverse calculation steps;

returning, as a result of the plurality of reduction steps and the plurality of inverse calculations, the arithmetic inverse or V; and as a part of the cryptographic process, multiplying the at least one value by the returned arithmetic inverse in place of the integer division to produce the cryptographic key.

12. A computer readable carrier according to claim 11, wherein the extended GCD algorithm is a left-shift binary GCD algorithm and the computer program instructions that cause the computer to perform the steps of combining multiple ones of the plurality of reduction steps and combining multiple ones of the plurality of inversion calculations includes the step of performing a reduction step according to a Lehmer GCD method.

13. Cryptographic apparatus which performs division operations over a finite field $F_U$ defined for a prime number U, in which at least one value is divided by an integer divisor V modulo U to generate a cryptographic key, the apparatus calculating an arithmetic inverse of V modulo U using an extended greatest common divisor (GCD) algorithm which includes a plurality of reduction steps and a plurality of inverse calculations, the apparatus comprising:

means for assigning U and V as initial values to respective temporary variables U3 and V3 which are used to calculate the GCD of U and V;

means for assigning initial values to respective temporary variables U2 and V2 which are used to calculate an arithmetic inverse of V modulo U; means for determining whether U3 has a number, N, of zero-value least significant bits (LSBs), where N is an integer greater than two; and means for combining multiple ones of the plurality of reduction steps and multiple ones of the inverse calculations if N is greater than two;

means for returning, as a result of the plurality of reduction steps and the plurality of inverse calculations, the arithmetic inverse of V; and as a part of the cryptographic process, means for multiplying the at least one value by the returned arithmetic inverse in place of the integer division to produce the cryptographic key.

14. Cryptographic apparatus according to claim 13, wherein:

the extended GCD algorithm is a binary GCD algorithm;

the means for combining multiple ones of the plurality of reduction steps includes means for shifting the value in U3 by N bit positions to less significant bit positions; and the means for combining multiple ones of the plurality of inversion calculations includes:

means for retrieving a value to be combined with V2 from a look-up table responsive to the value of N;

means for combining the retrieved value from V2 to obtain a combined value in V2; and means for shifting the combined value in V2 by N bit positions to less significant bit positions.

15. Apparatus according to claim 14, wherein the look-up table includes a plurality of multiples of U.

16. Apparatus according to claim 15, wherein:

the means for retrieving the value to be combined with V2 from a look-up table includes;

means for indexing a first further look-up table responsive to two of the LSBs of V2 if N equals 2 to obtain an index value;

means for indexing a second further look-up table responsive to three of the LSBs of V2 if N is greater than 2 to obtain the index value; and means for indexing the look-up table by the index value.

17. Cryptographic apparatus which performs division operations over a finite field $F_U$ defined for a prime number U, in which at least one value is divided by an integer divisor V modulo U to generate a cryptographic key, the apparatus calculating an arithmetic inverse of V modulo U using an extended greatest common divisor (GCD) algorithm which includes a plurality of reduction steps and a plurality of inverse calculations, the apparatus comprising:

means for assigning U and V as initial values to respective temporary variables U3 and V3 which are used to calculate the GCD of U and V;

means for assigning initial values to respective temporary variables U2 and V2 which are used to calculate an arithmetic inverse of V modulo U;

means for determining whether a bit position of a most significant bit (MSB) of the value in U3 differs by less than a predetermined number from a bit position of an MSB of the value in V3; and means for combining multiple ones of the plurality of reduction steps and multiple ones of the inverse calculations if the bit position of the MSB of the value in U3 differs by less than the predetermined number from the bit position of the MSB of the value in V3.

18. Apparatus according to claim 17, wherein:

the extended GCD algorithm is a left-shift binary GCD algorithm; and the means for combining multiple ones of the plurality of reduction steps and multiple ones of the plurality of inversion calculations includes means for performing a reduction step according to a Lehmer GCD method.

* * * * *